United States Patent
Schmugar et al.

(10) Patent No.: US 6,654,751 B1
(45) Date of Patent: Nov. 25, 2003

(54) METHOD AND APPARATUS FOR A VIRUS INFORMATION PATROL

(75) Inventors: Craig Schmugar, Hillsboro, OR (US); Vincent Gullotto, Beaverton, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 138 days.

(21) Appl. No.: 10/001,659

(22) Filed: Oct. 18, 2001

(51) Int. Cl.$^7$ ................................................. G06F 17/00
(52) U.S. Cl. ............................. 707/10; 713/200; 707/3; 707/4; 707/5; 707/6; 707/101; 707/102; 707/200
(58) Field of Search ................... 707/1–10, 100–104.1, 707/200–206; 713/200–202, 182–186; 711/100, 1–6

(56) References Cited

U.S. PATENT DOCUMENTS

| | | | | | |
|---|---|---|---|---|---|
| 5,960,439 | A | * | 9/1999 | Hamner et al. | 707/102 |
| 6,049,819 | A | * | 4/2000 | Buckle et al. | 707/10 |
| 6,351,776 | B1 | * | 2/2002 | O'Brien et al. | 707/100 |

OTHER PUBLICATIONS

Spinellis, Reliable identification of bounded–length viruses is NP–complete, Information Theory, IEEE Transactions on, vol. 49, Issue 1, Jan. 2003, pp. 280–284.*

Kubota et al., Schema representation in virus–evolutionary genetic algorithm for knapsack problem, Evolutionary Computation Proceedings, 1998, IEEE World Congress on Computational Intelligence, The 1998 IEEE International Conference on, May 4–9, 1998, pp.*

Hruska, Virus detection, Security and Decteion, 1997, ECOS 97, European Conference on, Apr. 28–30, 1997, pp. 128–130.*

* cited by examiner

*Primary Examiner*—David Jung
(74) *Attorney, Agent, or Firm*—Blakely Sokoloff Taylor & Zafman LLP; Christopher J. Hamaty

(57) ABSTRACT

A virus information patrol (VIP) data collector is provided to monitor virus information repositories and to collect selected virus descriptor data into a VIP database in accordance with a VIP configuration data. The VIP configuration data may include various VIP criteria to determine which virus information repositories to patrol and which virus descriptor data to collect. The VIP configuration data may further include a VIP indicator of whether to include or exclude a particular repository or virus descriptor data that satisfies the various VIP criteria. The VIP configuration data may further include a VIP category that describes the type of virus descriptor data that satisfies the various VIP criteria.

43 Claims, 11 Drawing Sheets

METHOD AND APPARATUS FOR A VIRUS INFORMATION PATROL

REFERENCE TO RELATED APPLICATIONS

This application is related to a concurrently filed utility application entitled, "Method and Apparatus for Presenting Virus Information," U.S. Pat. application Ser. No. 10/035,795.

FIELD OF THE INVENTION

The invention generally relates to computer virus information, and more particularly to disseminating information about computer viruses.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Networks Associates Technology, Inc., All Rights Reserved.

BACKGROUND

With the advent of general access computer networks, such as the Internet, people may now easily exchange application programs and application data between computer systems. Unfortunately, some people have taken advantage of such easy data exchange by developing computer "viruses" designed to spread among and sometimes attack interconnected devices, such as networked computers. A virus is application code that executes on one's computer without one's knowledge, and against one's interests. Viruses tend to replicate themselves within all interconnected devices, allowing an exponential "infection" of other devices. In addition, the number of viruses that can infect a computer has grown exponentially, with the proliferation of several new viruses every day.

In response to the security threat intrinsic to viruses, it is critical for a user to keep abreast of current threats. Nearly all virus information is disseminated in the form of a virus alert posted to one of several virus information websites. The virus alert contains information that describes the virus, including its name, a description of how it operates, and other breaking news and announcements related to the virus. It is not uncommon for information about the same virus to be posted to each of the several virus information websites, with varying levels of specificity and accuracy.

With so much information available on the web, it is difficult to stay on top of breaking news and announcements or other information about new or current threats. System administrators responsible for a company-wide system of networked computers must be especially vigilant. Unfortunately, it is an extremely time-consuming task to monitor all of the virus alerts posted to the various websites. In addition, there is no uniform way of searching through the current and historical data that the websites contain.

SUMMARY OF THE INVENTION

According to one aspect of the present invention, a virus information patrol (VIP) data collector monitors virus information repositories and collects selected virus descriptor data into a VIP database in accordance with a VIP configuration data. The VIP configuration data may include various VIP criteria to determine which virus information repositories to patrol and which virus descriptor data to collect. The VIP configuration data may further include a VIP indicator of whether to include or exclude a particular repository or virus descriptor data that satisfies the various VIP criteria. The VIP configuration data may further include a VIP category that describes the type of virus descriptor data that satisfies the various VIP criteria.

According to another aspect of the present invention, a VIP data presenter searches, en formats, and presents the collected virus descriptor data in the VIP database to a user in accordance with a VIP selection data.

In addition to the aspects and advantages of the present invention described in this summary, further aspects and advantages of the invention will become apparent by reference to the drawings and by reading the detailed description that follows.

BRIEF DESCRIPTION OF THE DRAWINGS

Features and advantages of the invention will become apparent to one skilled in the art to which the invention pertains from a review of the following detailed description and claimed embodiments of the invention in conjunction with the drawings, and in which:

DETAILED DESCRIPTION

In the following description various aspects of the present invention, a method and apparatus for a virus information patrol, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Parts of the description will be presented using terminology commonly employed by those skilled in the art to convey the substance of their work to others skilled in the art, including terms of operations performed by a computer system or virus scanner, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

A system administrator is charged with the task of quickly monitoring and assessing the threat presented by computer viruses, including finding the most currently available information on a particular virus, as well as historical data regarding past and present viruses. In accordance with one embodiment, the method and apparatus of the present invention simplifies the system administrator's task by monitoring a repository of virus information for new content, and collecting and archiving virus descriptor data obtained from the repository. In one embodiment, the method and apparatus of the present invention further provides an accessible interface for the system administrator or other user, so that they can easily view and analyze the virus descriptor data in order to assess the threat.

Figure 1:
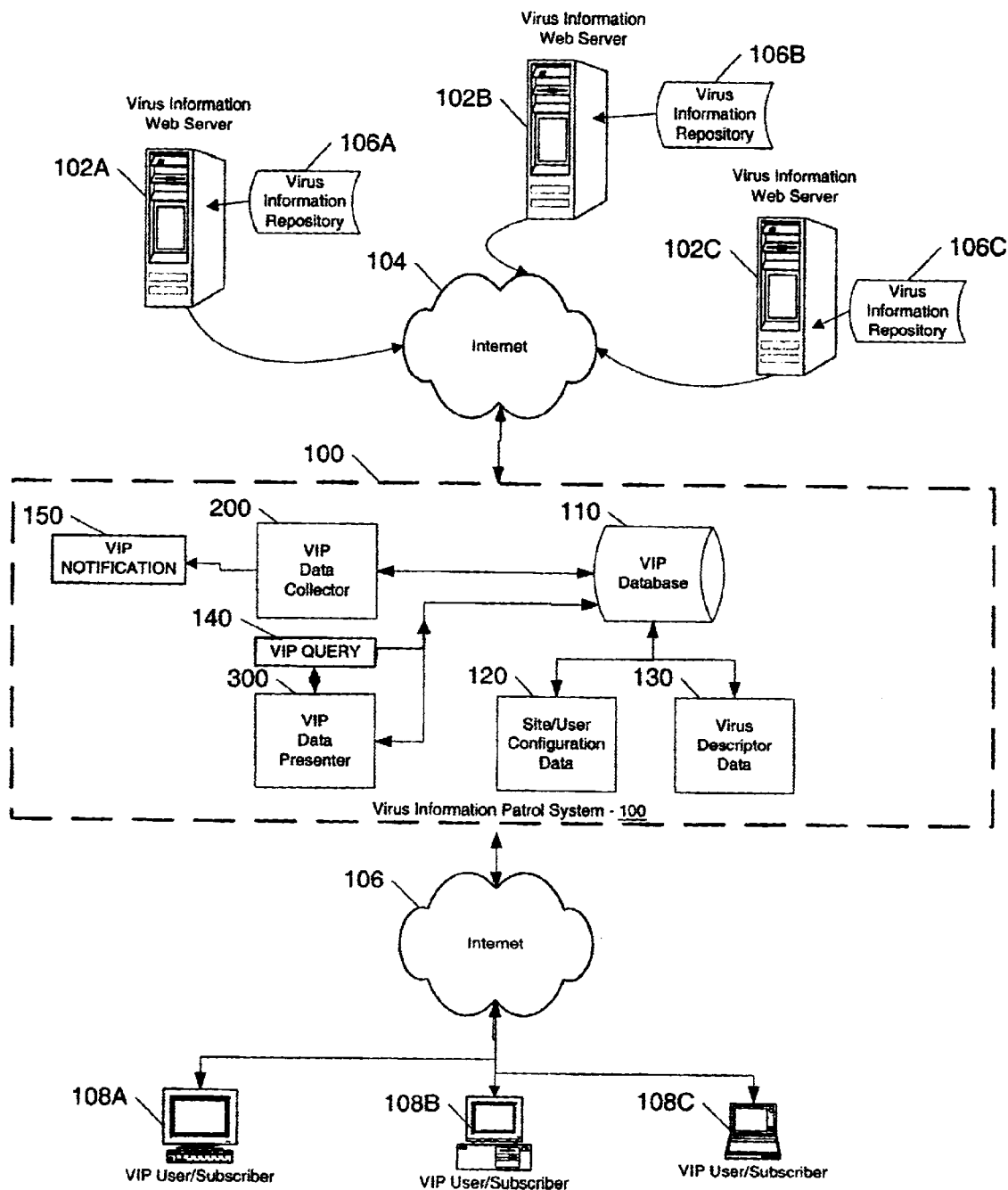
FIG. 1 is a block diagram illustrating one generalized embodiment of a virus information patrol (VIP) system incorporating the invention, and the operating environment in which certain aspects of the illustrated invention may be practiced.

FIG. 1 is a block diagram illustrating one generalized embodiment of a virus information patrol (VIP) system 100 incorporating the invention, and the operating environment in which certain aspects of the illustrated invention may be practiced. The illustrated VIP system 100 operates in conjunction with one or more virus information web servers 102A, 102B, and 102C that contain virus information repositories 106A, 106B, and 106C, in which information about computer viruses is maintained. The virus information repositories 106A, 106B, and 106C, are typically created and maintained by various anti-virus software companies or clearing houses that report on new viruses as they are unleashed on the unsuspecting user. The virus information repositories 106A, 106B, and 106C will typically comprise data in the form of web pages, or other data formats, that are variously structured in a predictable manner so as to allow the VIP system 100 to parse them into identifiable aspects of virus descriptor data, such as a hyperlink for a summary or detailed description of the virus, or a hyperlink for a news item about the virus, or the like.

In one embodiment, the virus information web servers 102A, 102B, and 102C may be remotely connected to the VIP system 100 through a communications network such as the Internet 104. In an alternate embodiment, the virus information web servers 102A, 102B, and 102C may even be locally connected to the VIP system 100 through a communications bus on a general computer system capable of running the VIP system 100.

The VIP System 100 comprises a VIP data collector 200 that patrols the virus information web servers 102A, 102B, and 102C, by monitoring and collecting selected virus descriptor data from the virus information repositories 106A, 106B, and 106C in accordance with a VIP configuration data 120 residing on a VIP database 110. The VIP configuration data 120 comprises various pre-defined parameter data that control the operation of the VIP data collector 200. After the selected virus descriptor data is collected, the VIP data collector 200 stores the collected data on the VIP database 110 in a table or other repository of virus descriptor data 130. In addition, the VIP data collector 200 creates certain other virus descriptor data 130 at the time of collection, such as the name of the anti-virus company that supplied the selected virus descriptor data, the name of the virus described, and the type of virus descriptor data (i.e. virus description or virus news).

In one embodiment, the illustrated VIP system 100 further operates in conjunction with one or more VIP subscriber clients 108A, 108B, and 108C, to retrieve and view the collected virus descriptor data 130 residing on the VIP database 110. For example, in one embodiment, the VIP data collector 200 generates a VIP notification 150 to notify an interested VIP subscriber 108A, 108B, or 108C about the newly collected virus description data 130. In one embodiment, the VIP subscriber clients 108A, 108B, and 108C operate further in conjunction with a VIP data presenter 300 that generates a VIP query 140 that is applied against the collected virus descriptor data 130 and formats the results of the VIP query 140 for presentation to a VIP subscriber in response to a VIP subscriber 108A, 108B, or 108C action.

In one embodiment, as with the virus information web servers 102A, 102B, and 102C, the VIP subscribers 108A, 108B, and 108C may be remotely connected to the VIP system 100 through a communications network such as the Internet 104. In an alternate embodiment, the VIP subscribers 108A, 108B, and 108C may even be locally connected to the VIP system 100 through a communications bus on a general computer system capable of running the VIP system 100.

In one embodiment, some of the components of the VIP system 100 may be embodied in a server computer that is accessible to the VIP subscriber clients 108A, 108B, and 108C, or the virus information web servers 102A, 102B, and 102C, via a remote or local communications interface. In one embodiment, certain components of the VIP system 100, such as the VIP data presenter 300, may be embodied in a distributed manner such that a portion of the VIP data presenter 300 resides on the VIP subscriber clients 108A, 108B, and 108C, and another portion resides on the accessible server computer.

In one embodiment, the VIP database 110 may comprise multiple database repositories distributed among one or more server computers that are accessible to the VIP subscriber clients 108A, 108B, and 108C, or the virus information web servers 102A, 102B, and 102C, via a remote or local communications interface. In one embodiment, portions of the VIP database 110 are distributed among the server computers. Alternatively, certain portions of the VIP database 110 may reside on the VIP subscriber clients 108A, 108B, and 108C, while other portions reside on the accessible server computers.

It should be noted that the operating environment illustrated in FIG. 1 is for descriptive purposes only, and other numerous configurations of an operating environment suitable for operating the VIP system 100 may be employed without departing from the scope of the invention.

Figure 2:
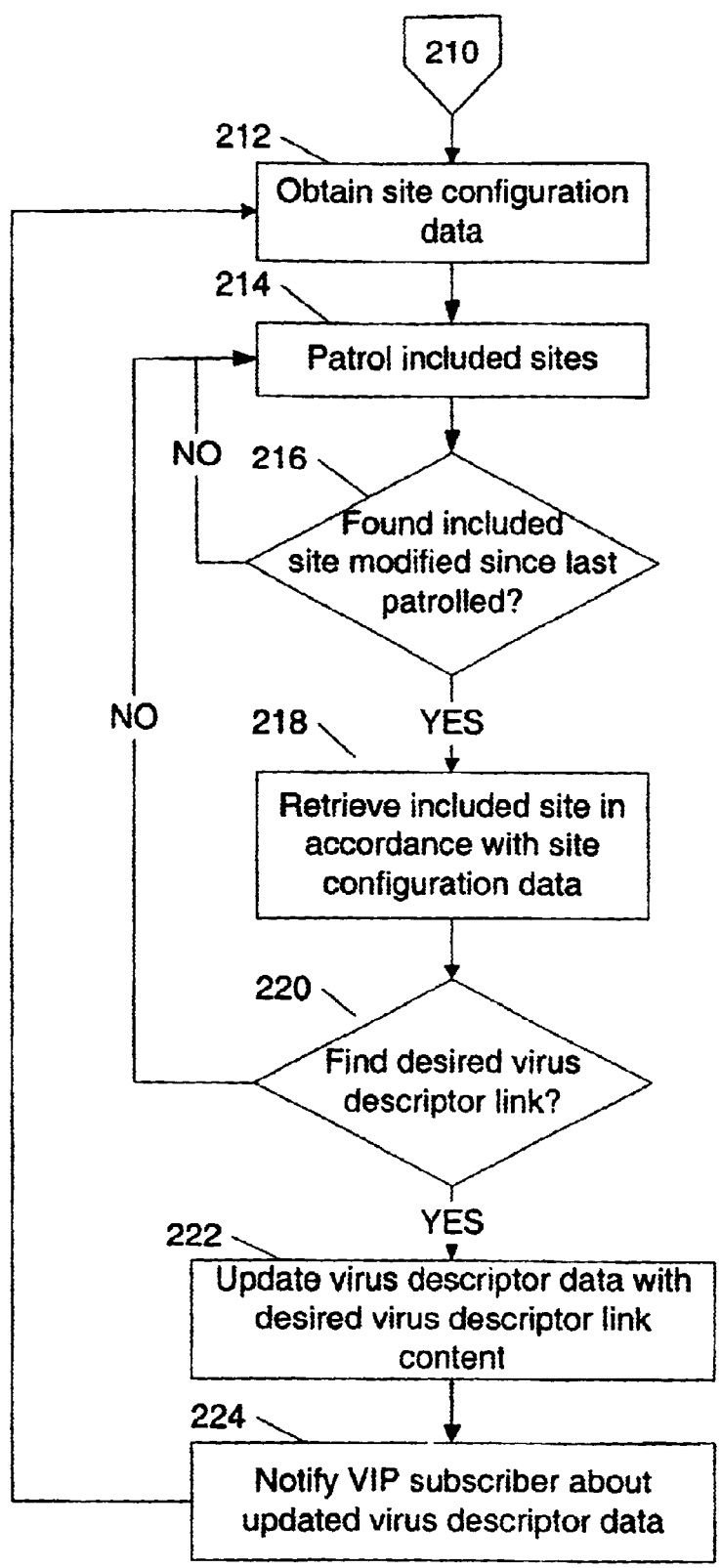
FIG. 2 is a flow diagram illustrating certain aspects of a method to be performed by a computer executing one embodiment of the illustrated invention shown in FIG. 1.
Figure 3:
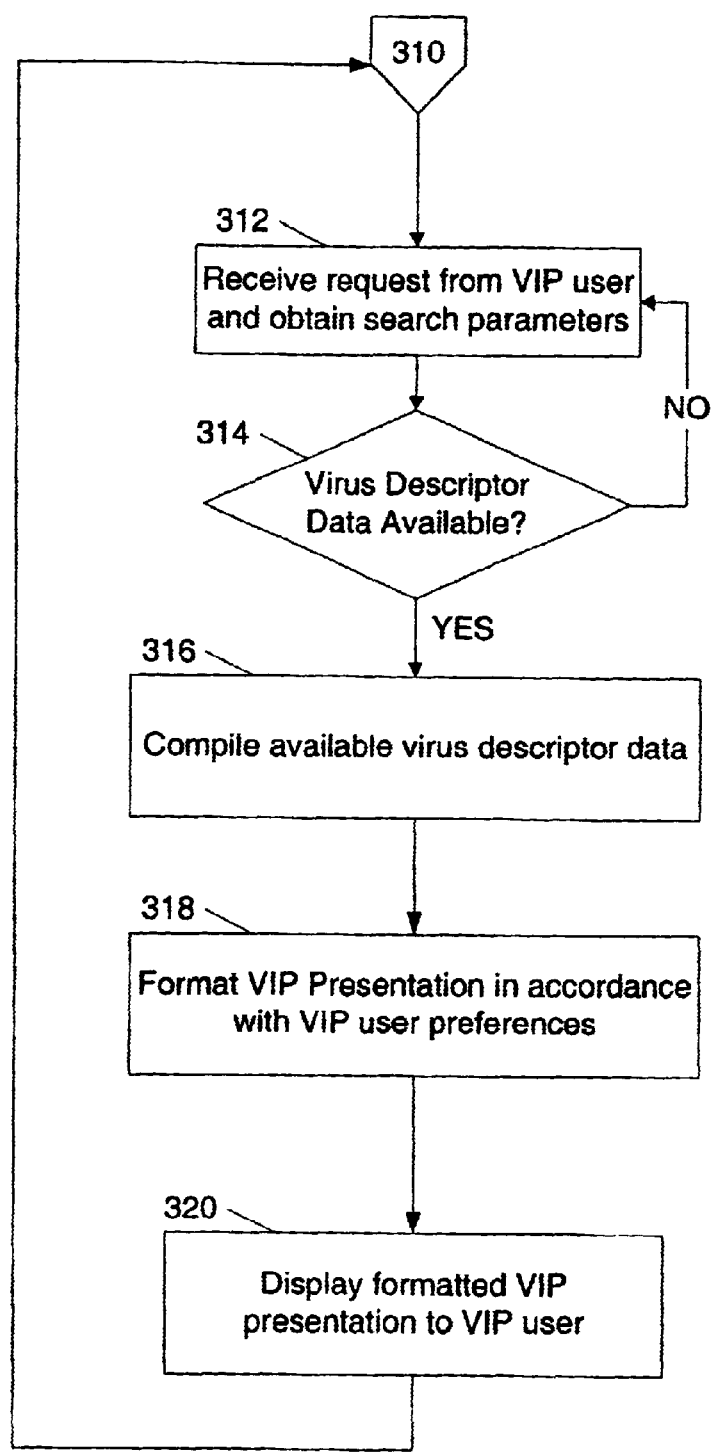
FIG. 3 is a flow diagram illustrating certain aspects of a method to be performed by a computer executing one embodiment of the illustrated invention shown in FIG. 1.

Turning now to FIGS. 2–3, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry-out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

FIG. 2 illustrates certain aspects of the VIP data collector 200 to monitor and collect virus descriptor data 130. In particular, FIG. 2 illustrates some of the acts to be performed by a computer executing a VIP data collector 200 that incorporates one embodiment of the invention.

As illustrated, at processing block 212, the VIP data collector 200 prepares for monitoring and collecting data by obtaining the VIP configuration data 120 from the VIP database 110. At block 214, the VIP data collector 200 commences patrolling certain web sites present on virus information web servers 102A, 102B, or 102C that are indicated on the VIP configuration data 120 for inclusion in the patrol. At processing block 216, if an included site is found during the patrol, the VIP data collector 200 determines whether the site has any new virus information to offer by comparing the date that the web site was last modified with the date, if available, that the web site was last patrolled. At processing block 218, when the date that the web site was last patrolled is earlier than the date that the information on the web site was last modified, the VIP data collector 200 retrieves selected virus information from the included web site in accordance with the VIP configuration data 120.

For example, when the uniform record locator (URL) that identifies the location of a web site on a virus information web server 102A is marked for inclusion in the VIP data collector's 200 patrol and the URL matches a URL criteria in the VIP configuration data 120, and the web site was modified after the VIP data collector's 200 previous patrol of the virus information web server 102A, the VIP data collector 200 parses out selected information from the included web site using a keyword, or search and replace or other selection criteria present in the VIP configuration data 120. For example, at process block 220, when the VIP data collector 200 finds a hyperlink in the included web site whose URL (or portion of the URL) matches a keyword parameter in the VIP configuration data 120, the VIP data collector 200 at process block 222 parses out the content of the matching hyperlink and updates the virus descriptor data 130 on the VIP database 110.

In addition, at processing block 222 the VIP data collector 200 creates certain corresponding virus descriptor data 130, such as assigning a type category to the newly updated virus descriptor data 130 in accordance with the type category specified in the VIP configuration data 120 for the included site and matching hyperlink. For example, when the matching hyperlink has a type on the VIP configuration data 120 indicating a news category, the virus descriptor data 130 being parsed out of the matching hyperlink is categorized as a news item related to a certain virus, whereas when the matching hyperlink has a type indicating a virus description category, the virus descriptor data 130 being parsed out of the matching hyperlink is categorized as a description of a certain virus operates. Numerous other type categories may be defined in the VIP configuration data 120 and virus descriptor data 130 without departing from the scope of the invention.

In one embodiment, at processing block 224, the VIP data collector 200 generates a VIP notification 150 to notify an interested VIP subscriber 108A, 108B, or 108C about the newly updated virus description data 130. The VIP notification 150 may be in the form of an email message, a voicemail message, or some form of an alert to a pager or other mobile communication device that is addressed or directed to a VIP subscriber and alerts the VIP subscriber to the existence of the updated virus description data 130.

FIG. 3 illustrates certain aspects of the VIP data presenter 300 to generate and apply a query and format selections from the collected virus descriptor data 130 for presentation to a VIP subscriber 108A, 108B, or 108C in response to a VIP subscriber action. In particular, FIG. 3 illustrates some of the acts to be performed by a computer executing a VIP data presenter 300 that incorporates one embodiment of the invention.

As illustrated, at processing block 312, the VIP data presenter 300 receives a request from a VIP subscriber 108A, 108B, or 108C to search for virus descriptor data 130 on the VIP database 110. In one embodiment, the request comprises one or more search criteria and may further include a format preference to list or sort the virus descriptor data that satisfies the search criteria in a specified way, e.g. sorted by company name, virus name, or the time the virus was reported, or to report statistical data about the virus descriptor data in a bar graph, or the like. At processing block 314, the VIP data presenter 300 generates a VIP query 140 from the received search criteria, and applies the VIP query 140 against the VIP database 110 to determine whether there are virus descriptor data 130 that satisfy the search criteria. If not, the VIP data presenter 300 returns control to the VIP subscriber 108A, 108B, or 108C and prompts the user to re-enter different search criteria. When there is virus descriptor data 130 available on the VIP database 110 that meet the search criteria, the VIP data presenter 300, at processing block 316, compiles the available virus descriptor data 130 in preparation for presentation to the VIP subscriber 108A, 108B, or 108C. At processing block 318, the VIP data presenter 300 formats the compiled virus descriptor data in accordance with the formatting preference requested by the VIP subscriber 108A, 108B, or 108C, and at processing block 320, the VIP data presenter 300 displays the formatted data to the VIP subscriber 108A, 108B, or 108C.

Figure 4:
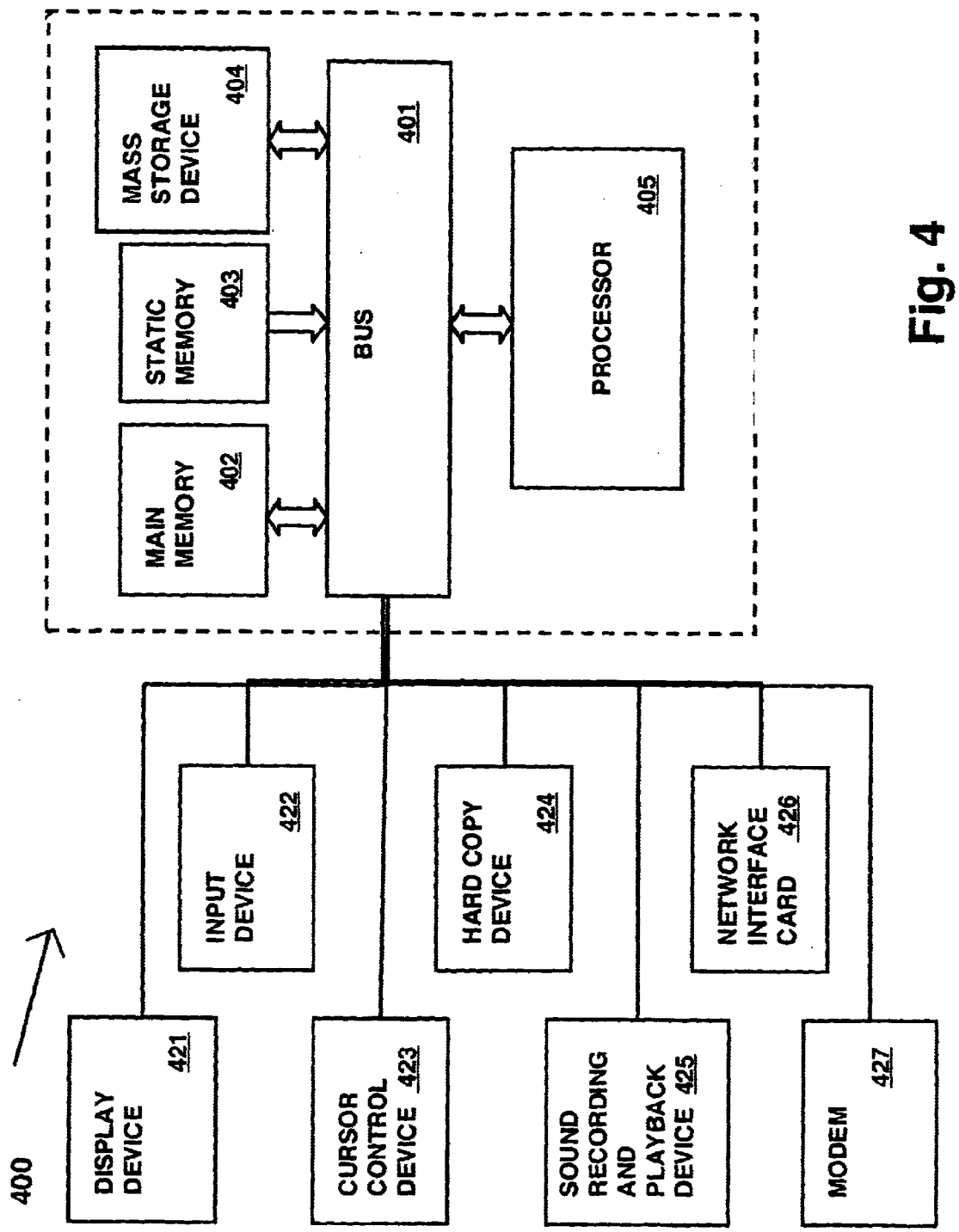
FIG. 4 illustrates a suitable computing environment in which certain aspects of the illustrated invention shown in FIGS. 1–3 may be practiced.

FIG. 4 and the following discussion are intended to provide a brief, general description of a suitable computing environment in which certain aspects of the illustrated invention may be implemented. The invention may be described by reference to different high-level program modules and/or low-level hardware contexts. Those skilled in the art will realize that program module references can be interchanged with low-level hardware instructions.

Program modules include procedures, functions, programs, components, data structures, and the like, that perform particular tasks or implement particular abstract data types. The modules may be incorporated into single and multi-processor computing systems, as well as hand-held devices and controllable consumer devices (e.g., Personal Digital Assistants (PDAs), cellular telephones, etc.). It is understood that modules may be implemented on a single computing device, or processed over a distributed network environment, where modules can be located in both local and remote memory storage devices. An exemplary system for providing the means for implementing the invention includes a general-purpose computer system 400 comprising a bus 401, or other communications hardware and software, for communicating information, and a processor (or processing unit) 405 coupled with bus 401 for processing information. Computer system 400 further comprises a random access memory (RAM) or other dynamic storage device 402 (referred to as main memory), coupled to bus 401 for storing information and instructions to be executed by processor 405. Computer system 400 also comprises a read only memory (ROM) 403, and/or other static storage device, coupled to bus 401 for storing static information and instructions for processor 405. Mass storage device 404 is coupled to bus 401 for storing information and instructions. In one embodiment, the instructions comprising the VIP system 100, and the VIP data collector 200 and VIP data presenter 300 may be stored on ROM 403. Alternatively, the instructions may be stored within mass storage device 404.

For example, ROM 403 and/or mass storage device 404 may include VIP data collector 200 instructions for a receiver to receive the VIP configuration data that identifies a location of the VIP data repository, a monitor to monitor the identified VIP repository to discover the virus descriptor links, a selector to select the discovered virus descriptor links, a collector to update the VIP database with the virus descriptor data obtained using the virus descriptor links, and a notifier to send notifications to the user/subscriber of the VIP database that new virus descriptor data has been collected. The ROM 403 and/or mass storage device 404 may further include VIP data presenter 300 instructions including a receiver to receive a search criteria from a user, a query generator to generate a query from the search criteria, a query applicator to apply the query to a virus descriptor data repository, and a user interface to present the virus descriptor data from the VIP database.

Furthermore, mass storage device 404, such as a magnetic disk or optical disk or other machine-accessible medium, and its corresponding disk drive, can be coupled to computer system 400 for accessing the information and instructions stored thereon via bus 401. Computer system 400 can also be coupled via bus 401 to a display device 421 for displaying information to a computer user such as a network manager. Display device 421 is used to display a graphical user interface to the present invention. Display device 421 can include a frame buffer, specialized graphics rendering devices, a cathode ray tube (CRT), and/or flat panel display. An input device 422, including a device with alphanumeric and other keys, or a voice command input device capable of accepting audio input is typically coupled to a bus 401 for communicating information and command selections to processor 405. Another type of user input device is a cursor control device 423, such as a mouse, a trackball, a pen, a touch screen, or cursor direction keys for communicating direction information and command selections to processor 405, and for controlling cursor movement on display device 421. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom. Another device that may be coupled to bus 401 is a hard copy device 424 which may be used for printing instructions, data, or other information on a medium such as paper, film, or similar types of media. Additionally, computer system 400 can be coupled to a device for sound recording, and/or playback 425, such as an audio digitizer coupled to a microphone for recording information. Further, the device may include a speaker that is coupled to a digital to analog (D/A) converter for playing back the digitized sounds.

Network interface card 426 is coupled to bus 401. Network interface card 426 is further coupled to an external computer network (not shown). Network interface card 426, in conjunction with appropriate data communications protocols (e.g., the TCP/IP suite of internetworking protocols), provide the means by which an embodiment of the present invention operating on a general-purpose computer system 400 exchanges information with other devices coupled to the same computer network. Modem 427 is coupled to bus 401, and provides an alternate means of exchanging information with other devices for which a modem connection to an external computer network or device (not shown) can be established.

Computer system 400 and the VIP system 100 stored and executed therein as part of the method and apparatus of the present invention operate in conjunction with an operating system with graphics capability, such as Microsoft's Windows or Windows CE operating systems. Commercially available computer systems implementing the features of general-purpose computer system 400 include a broad range of operating system-based computers, including server computers, desktop computers, workstations, personal digital assistants, devices, or other computer appliances. Furthermore, the present invention may be used in conjunction with various browsers (e.g. Microsoft Internet Explorer or Netscape Navigator) designed for both conventional and wireless web servers and various electronic mail applications (e.g. Microsoft Outlook, and Lotus Notes) or other messaging applications to yield an operational platform upon which an embodiment of the present invention may be implemented.

The storage systems and associated machine-accessible media provide storage of data and executable instructions for the computing device 400. Storage options include hard-drives, floppy-disks, optical storage, magnetic cassettes, tapes, flash memory cards, memory sticks, digital video disks, and the like, and may be connected to the bus 401 by way of an interface. Computing device 400 is expected to operate in a networked environment using logical connections to one or more remote computing devices through a network interface 426, modem 427, or other communication pathway. Computing devices may be interconnected by way of a network such as a local intranet or the Internet.

FIGS. 5, 6A, 6B, 7, 8, 9A and 9B illustrate various aspects of a user interface to be generated by a computer executing one embodiment of the illustrated invention shown in FIG. 1. Specifically, the VIP data presenter 300 operates in conjunction with the graphics capability of the operating system of the computer, such as Microsoft's Windows or Windows CE operating systems, to generate the search/query interfaces illustrated in FIGS. 5, 6A, 6B, and 7, and the results user interfaces illustrated in FIGS. 8, 9A and 9B.

It should be noted that the illustrated interfaces reflect just one embodiment of the present invention, and that other variations of the interfaces may be employed without departing from the scope of the invention.

Figure 5:
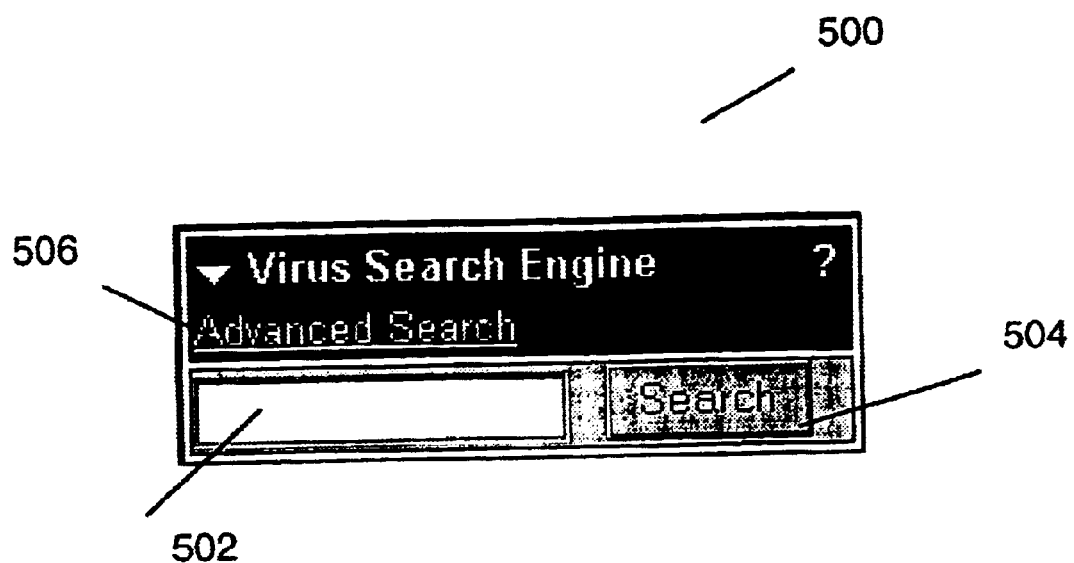
FIGS. 5, 6A, 6B, and 7 illustrate various aspects of a search/query user interface to be generated by a computer executing one embodiment of the illustrated invention shown in FIG. 1.

In one embodiment, the VIP data presenter 300 generates a virus search engine interface 500 as illustrated in FIG. 5, with at least one input area 502 for a user to input a search criterion, and a search command button 504 to initiate the VIP query 140 to the VIP database 110. In one embodiment, the search criterion is a word or phrase, such as the phrase "Code Red." The VIP data presenter 300 receives the search criterion in the input area 502 and, upon activation of the search command button 504, activates a VIP query 140 that is applied to the VIP database 110 to determine whether there is virus descriptor data 130 that meets the search criterion, e.g. whether there are any occurrences of the phrase "Code Red" in the virus name, virus description, or virus link portions of the virus descriptor data 130. If not, the user is prompted to re-enter a different search criterion in input area 502. In one embodiment, an advanced search link 506 is also provided for a user to navigate to the advanced search/query interfaces illustrated in FIGS. 6A and 6B, as described below.

Figure 6A:
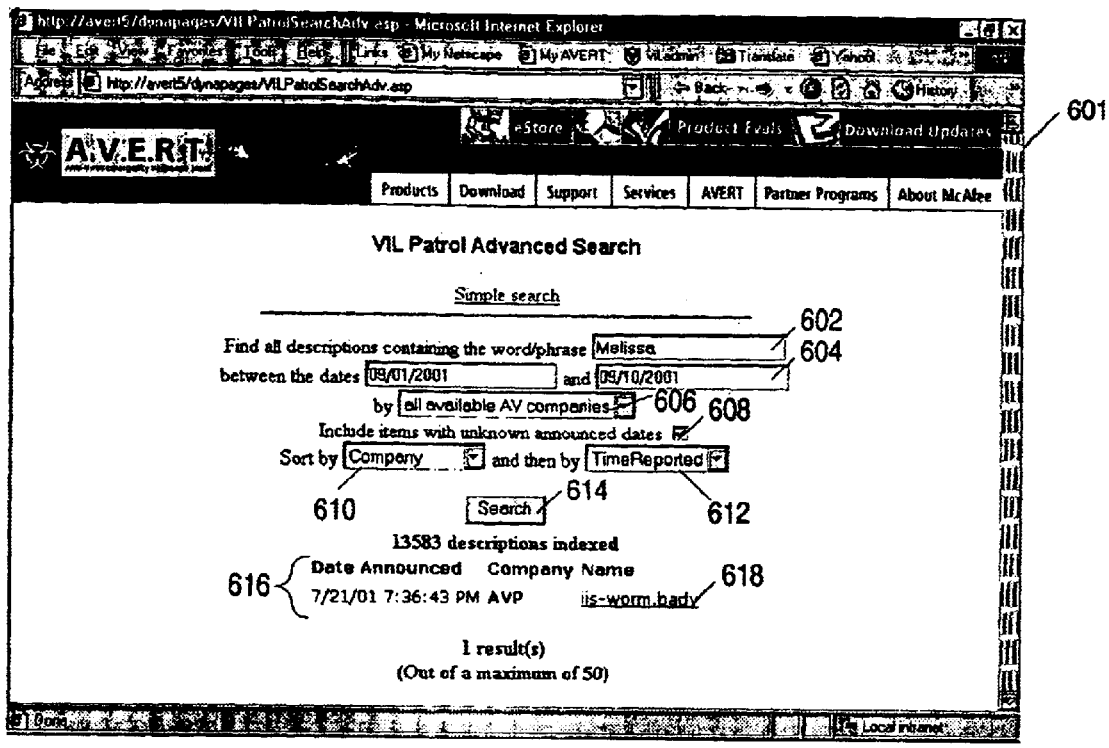
Figure 6B:
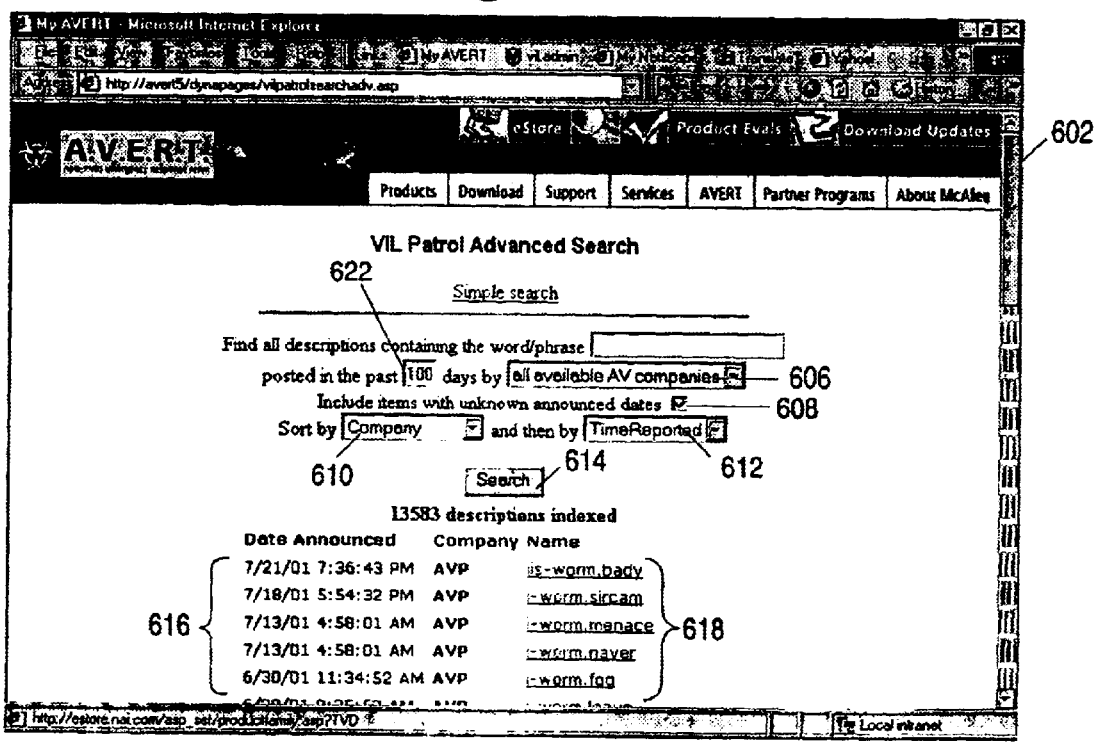

In one embodiment, the VIP data presenter 300 generates an advanced virus search engine interface 601 and 602 as illustrated in FIGS. 6A and 6B, respectively. The advanced virus search engine interface 601 is comprised of at least two or more input areas to input various types of search criteria. For example, in one embodiment, there is one input area 602 to input a word/phrase search criterion. For example, as shown in the illustrated embodiment, the user has entered the word "Melissa" to find all virus descriptor data 130 containing the word "Melissa." The advanced virus search engine interface 601 further comprises at least one more input area 604 to enter a date or date/range search criteria, and/or at least one more input area 606 to enter a company name search criterion. In one embodiment, at least one more input area 608 is also provided to indicate whether to include virus descriptor data 130 that has an unknown announced date, i.e. when it cannot be determined from the virus description information collected from the virus information web servers 102A, 102B, and 102C when the virus was first announced.

In one embodiment, the advanced virus search engine interface 601 is further comprised of at least one input area 610 to enter a formatting preference. In the illustrated example of FIG. 6A, the formatting preference is to sort the results of the query by a specified field of the virus descriptor data 130, such as the name of the company that reported the virus information. In one embodiment, at least one more input area 612 is provided to enter a formatting preference to further sort the results of the query by another field of the virus descriptor data 130, such as the time reported. It should be noted that other formatting preferences might be provided for on the advanced search engine interface 601 without departing from the scope of the invention. Similarly to the search interface 500, the advanced search interface 601 is provided with an input command button 614 to activate a complex VIP query 140 to the VIP database 110 to determine whether there is virus descriptor data 130 that meets the advanced search criteria.

Figure 8:
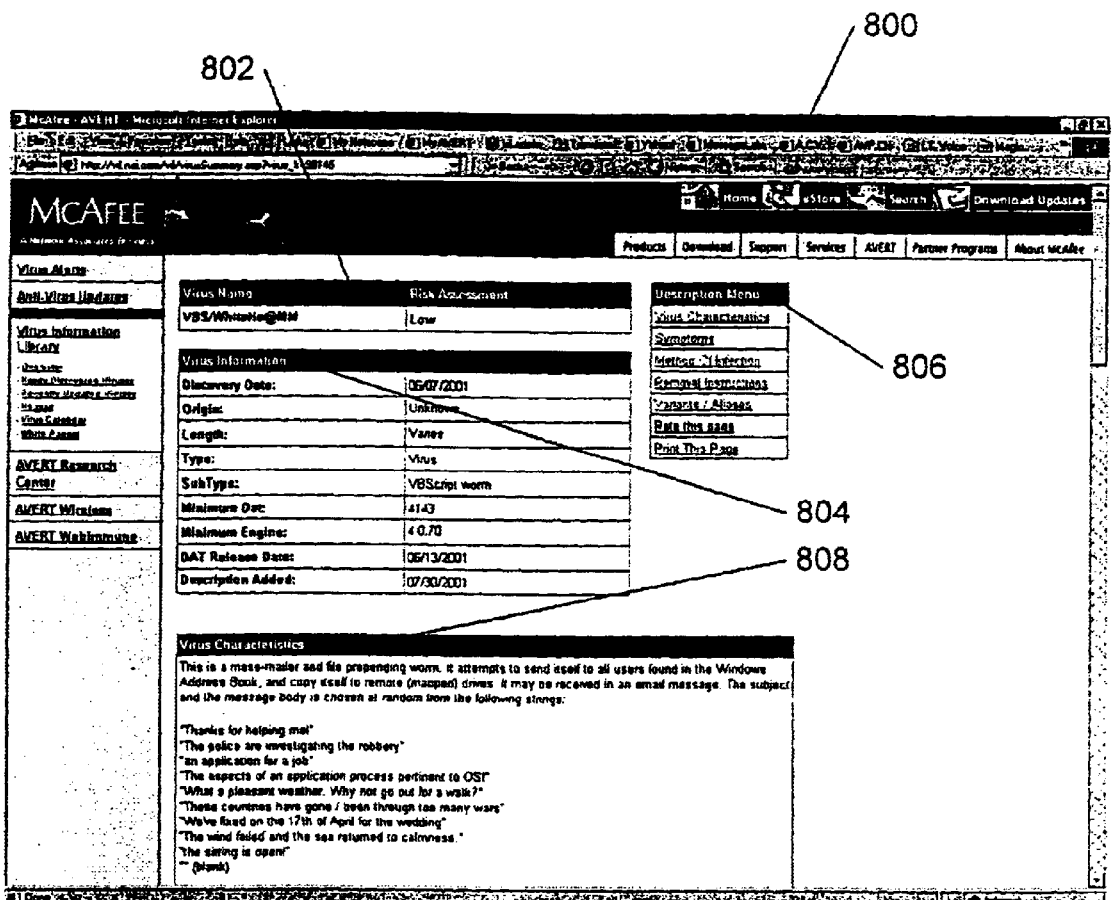
FIGS. 8, 9A, and 9B illustrate various aspects of a results user interface to be performed by a computer executing one embodiment of the illustrated invention shown in FIG. 1.

Upon activation of the complex VIP query 140 through the command button 614, a result summary 616 is displayed to the user in the advanced search interface 601. In one embodiment, the result summary 616 may be displayed to the user in a separate window of the advanced search interface 601 without departing from the scope of the invention. As illustrated, the result summary 616 may be comprised of a list of virus descriptor data 130 showing the date the virus was announced, the name of the company that announced it, and a detail link 618 to a detailed results interface as illustrated in FIG. 8 and described below. In one embodiment, the detail link 618 is a hyperlink to a web page hosted by the AV company from whom the virus descriptor data 130 was originally collected. In one embodiment, the advanced search interface 601 is further provided with a link 620 to another virus search engine interface such as the search interface 500 illustrated in FIG. 5.

FIG. 6B illustrates an alternate embodiment of an advanced search interface 602, which is similar to the advanced search interface 601, except that an alternate embodiment of an input area 604 to enter a date or date/range search criteria is shown. Specifically, the advanced search interface 602 comprises an input area 622 to indicate a number of days in the past within which to confine the complex VIP query 140 generated by the VIP data presenter 300.

Figure 7:
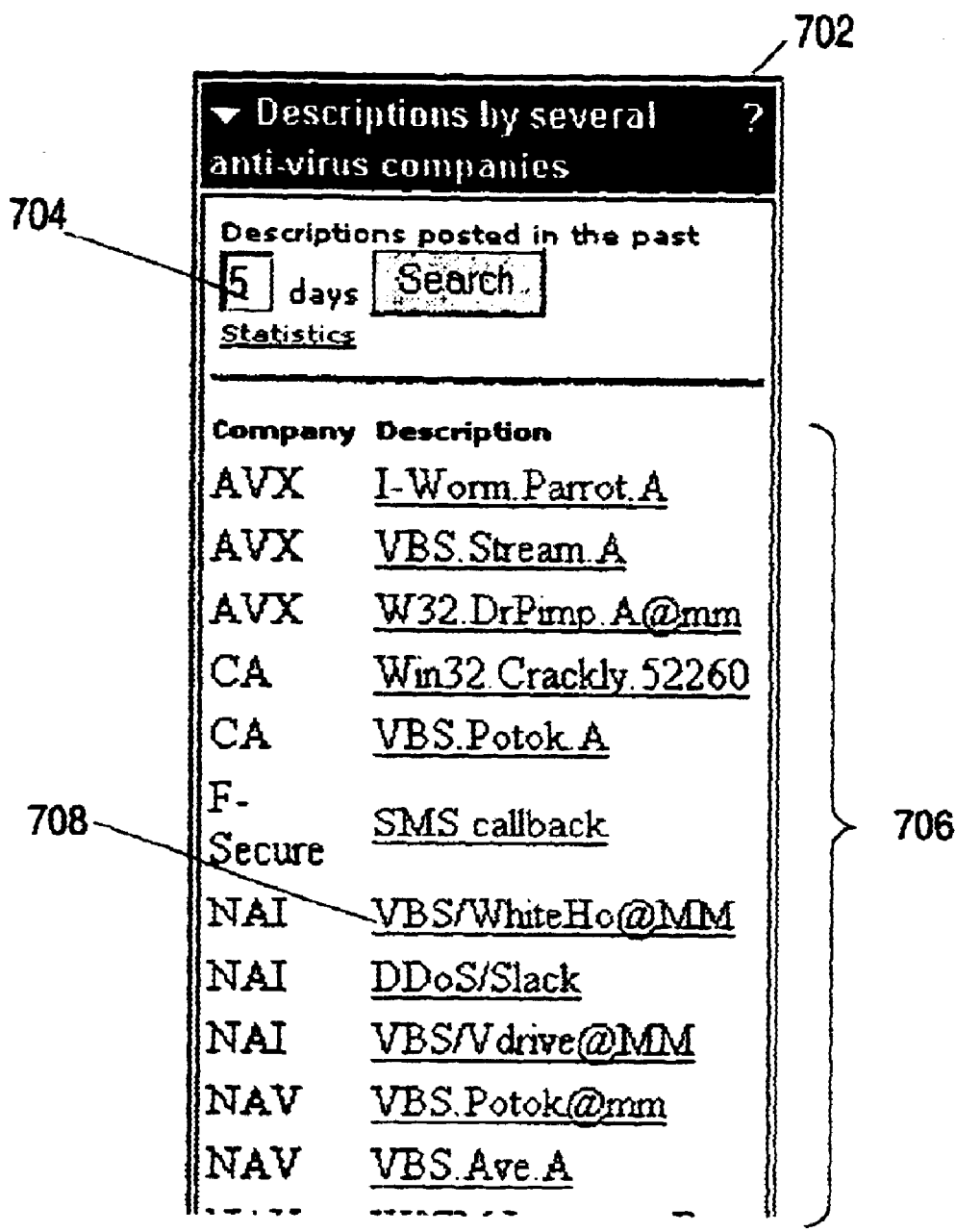

FIG. 7 illustrates an alternate embodiment of a multi-company search interface 702, which is similar to the search interface 502, except that it provides an input area 704 to indicate a number of days in the past within which to confine the VIP query 140 generated by the VIP data presenter 300. For example, when the number of days entered in input area 704 is five, the VIP data presenter 300 generates a VIP query and applies it to the VIP database 110 to determine whether there is virus descriptor data 130 that was posted in the last five days for any virus by any company. A result summary 706 is displayed to the user in the multi-company search interface 702. In one embodiment, the result summary 706 may be displayed to the user in a separate window of the multi-company search interface 702 without departing from the scope of the invention. As illustrated, the result summary 706 may be comprised of a list of virus descriptor data 130 showing the name of the company that announced the virus, and a detail link 708 to a detailed results interface as illustrated in FIG. 8 and described below. In one embodiment, the detail link 708 is a hyperlink to a web page hosted by the AV company from whom the virus descriptor data 130 was originally collected, e.g. the company that announced the virus. In one embodiment, the VIP data presenter 300 further provides the multi-company search interface 702 with a statistics link 710 to a statistics interface as illustrated in FIGS. 9A and 9B and described below.

FIG. 8 illustrates a virus detail interface 800 that the VIP data presenter 300 generates in response to activation of the detail links 618 and 708 in the result summaries 616 and 706 that were generated in response to the above-described VIP queries 140. In the illustrated embodiment, the virus detail interface 800 is actually a web page hosted by the company from whom the virus information was collected. As shown, the virus detail interface 800 comprises a display area for the virus name and risk assessment 802, a display area for various items of bibliographic virus information 804, such as the discovery date, origin, length, type, subtype, minimum DAT, minimum engine, the DAT release date, and description added date. In addition, the virus detail interface 800 further comprises a display area for a description menu 806, that provides hyperlinks to other areas of the virus detail interface 800, such as the virus characteristics 808, and other areas (not shown), such as the symptoms, method of infection, removal instructions, and variants/aliases. The information displayed in the virus name/risk assessment area 802, the bibliographic virus information area 804, and virus characteristics 808, and other areas for displaying symptoms, method of infection, removal instructions, and variants/aliases are obtained from the content of the virus descriptor data 130 that met the search criteria entered in the various search interfaces 500, 601, 602, and 702, and may include the actual description of the virus, or news items about the virus, or whatever other information about the virus that the anti-virus company posted to their virus information repositories 106A, 106B, and 106C on their virus information web sites 102A, 102B, and 102C. It should be noted that several other variations in the virus detail interface 800 may be employed without departing from the scope of the invention.

Figure 9A:
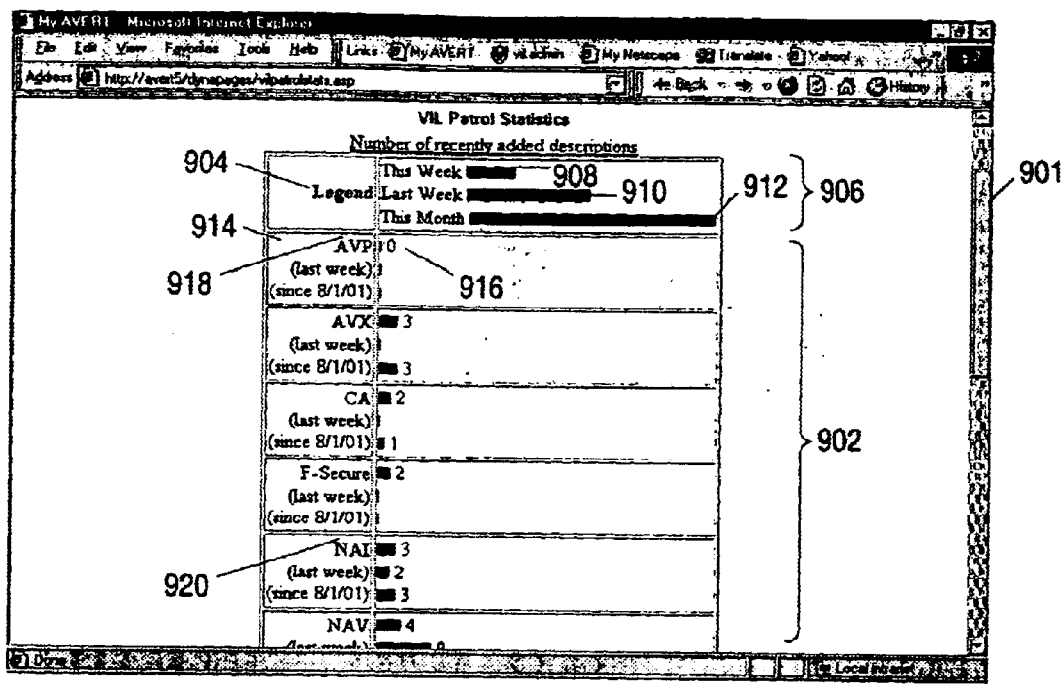
Figure 9B:
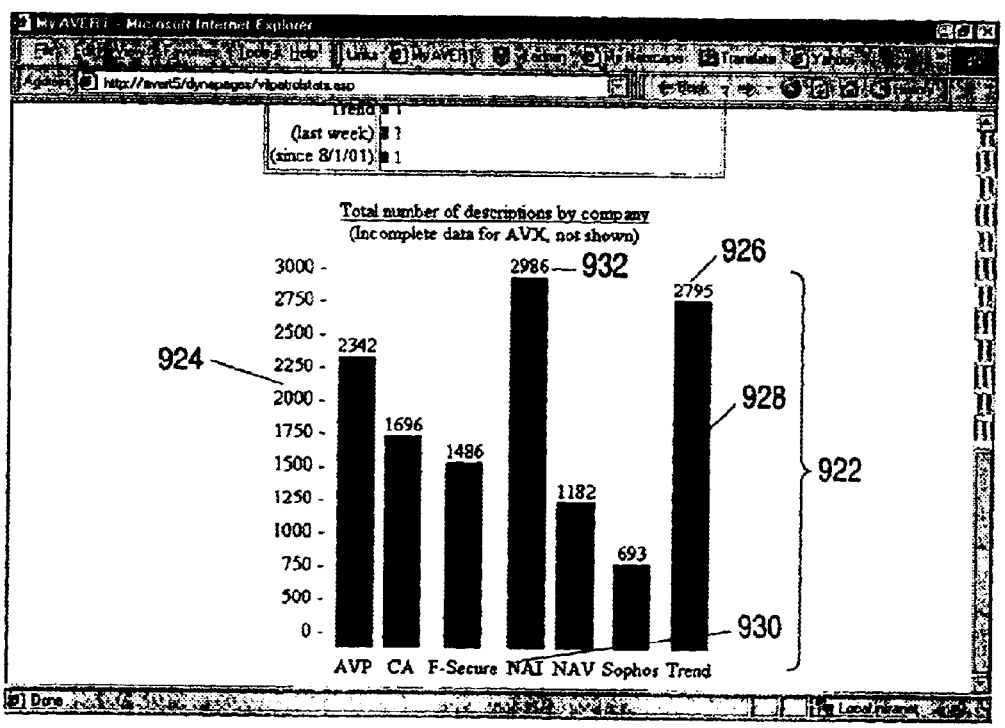

FIGS. 9A–9B illustrate an example of a statistics interface 900 that is displayed in response to activation of a statistics link that was provided on one of the search interfaces, such as statistics link 710 on the multi-company search interface 702. In one embodiment, the statistics interface 901 in FIG. 9A comprises a bar graph 902 showing the number of virus descriptions added to the virus descriptor data 130 on the VIP database 110 within a number of days specified by the user in the search interface, such as the number of days entered in input area 704 on the multi-company search interface 702. The bar graph 902 comprises a legend 904 showing a visual aid 906, e.g. a color, a number, or a graphical pattern, that helps the user to discern what the displayed bar graph represents, e.g. the number of descriptions added this week 908, last week 910, or this month 912. The bar graph 902 further comprises detail data 914 that includes the name 916 of the company that posted the virus alert information to their virus information web server 102A, 102B, or 102C, and a numerical representation 918 of the number of descriptions depicted in each bar of the bar graph. For example, in the detail data 910 for the company named NAI 920, the number of virus alerts added to the virus descriptor data 130 this week is three, last week is two, and this month (i.e. since Aug. 1, 2001) is three.

FIG. 9B illustrates an alternate embodiment of a statistics interface 921 that comprises a histogram 922 showing by company the total number of virus descriptions in the virus descriptor data 130 on the VIP database 110. The histogram 922 comprises a vertical legend 924 along the left-hand side that shows in regular increments the number of virus descriptions corresponding to the height 926 of the individual histogram bars 928. The histogram 924 further comprises a horizontal legend 930 along the bottom that shows the name of the company that each of the k individual histogram bars 928 represent. For example, in the illustrated embodiment, the company NAI in horizontal legend 930 has a total of nearly 3000 virus descriptions that have been added to the virus description data 130 on VIP database 110. The exact number 932 of virus descriptions of 2,986 is shown on the top of each company's individual histogram bar.

It should be noted that the statistics interfaces 901 and 921 illustrated in FIGS. 9A and 9B are for descriptive purposes only and other graphical depictions of statistical data that can be computed for the virus descriptor data 130 may be displayed without departing from the scope of the invention.

Figure 10:
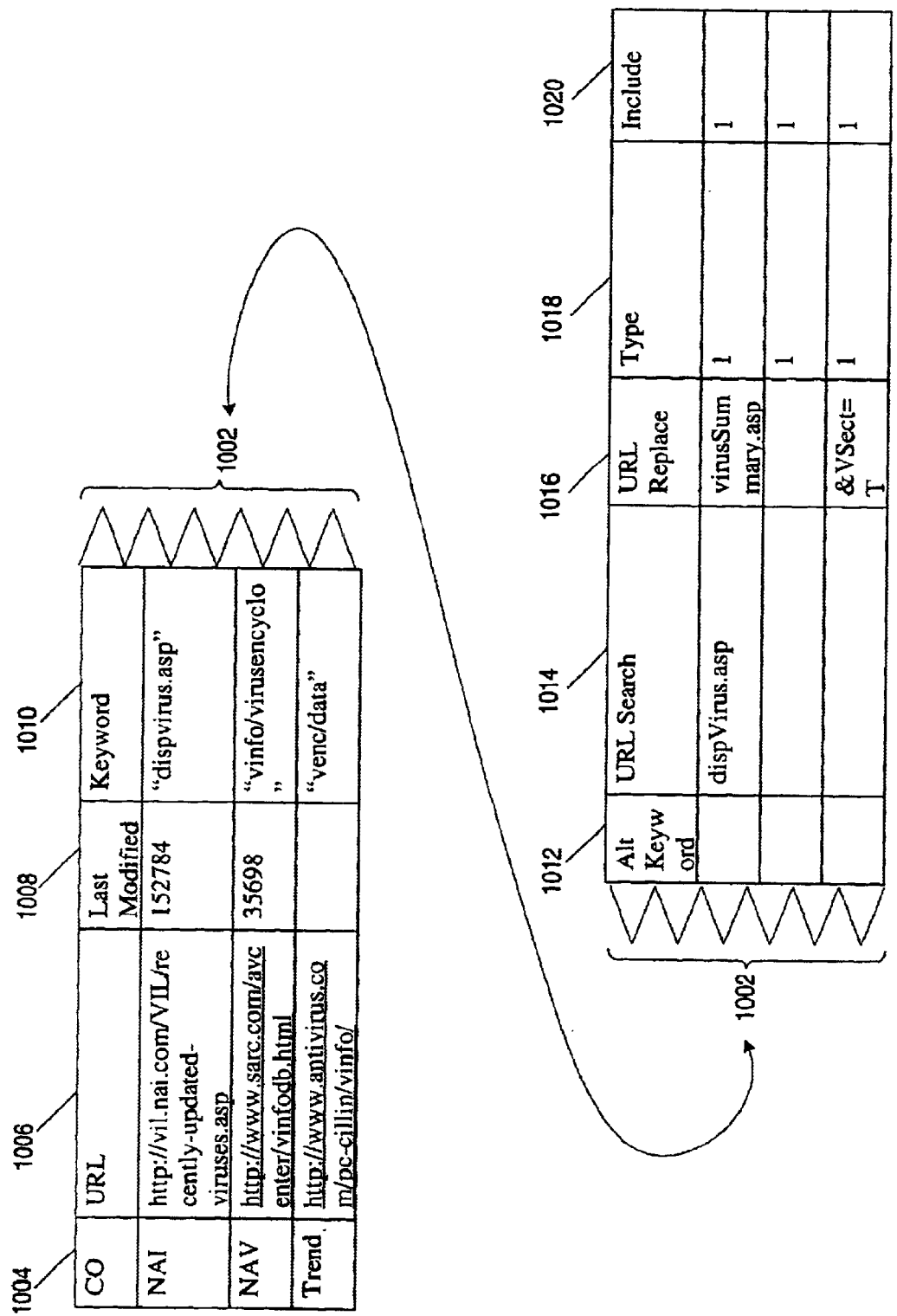
FIG. 10 illustrates various aspects of a VIP database to be accessed by a computer executing one embodiment of the illustrated invention shown in FIG. 1.

FIG. 10 illustrates various aspects of a VIP database 110 to be accessed by a computer executing one embodiment of the illustrated invention shown in FIG. 1. Specifically, FIG. 10 illustrates an example of VIP configuration data 120 that is stored on VIP database 110. The VIP configuration data 120 comprises numerous records 1002 representing virus alerts that may be found on various virus information web servers 102A, 102B, and 102C, and which are identified as candidates for patrolling by the VIP system 100.

For example, FIG. 10 illustrates three records 1002, one for a virus alert that may be found on a virus information web server 102A operated by anti-virus company NAI, one for a virus alert that may be found on a virus information web server 102B operated by anti-virus company NAV, and one for a virus alert that may be found on a virus information web server 102C operated by anti-virus company Trend.

Each record 1002 is comprised of numerous data fields that represent the various pre-defined configuration data that identify the virus alerts that may be patrolled by VIP system 100 and thereby control the operation of the VIP data collector 200. The data fields include a company name 1004 that identifies the anti-virus company with which the record 1002 is associated, a URL address 1006 of the location of the virus information repository 106A, 106B, or 106C where the virus alert may be found, a last modified date 1008 indicating the last time the virus information repository 106A, 106B, or 106C was modified (as determined from the last time it was patrolled), a keyword 1010 that specifies a string of characters that must be present in all or a portion of a hyperlink address that identifies the location of a virus alert on the virus information repository 106A, 106B, or 106C before being considered for patrol, an alternate keyword 1012 that optionally specifies an alternate string of characters that must be present in all or a portion of a hyperlink address that identifies the location of a virus alert on the virus information repository 106A, 106B, or 106C before being considered for patrol, the alternate keyword 1012 being used after determining that the keyword 1010 is not present, a URL Search term 1014 that specifies all or a portion of the keyword-identified hyperlink address that may need to be replaced with a URL Replace term 1016 in order to link to the actual location of the virus alert on the virus information repository 106A, 106B, or 106C, the URL Replace term 1016 that specifies the replacement term associated with the URL Search term 1014, a Type indicator 1018 that specifies the category with which the virus alert is associated, and an Include flag 1020 that specifies whether to include (i.e. is "on") or exclude (i.e. is "off") this virus alert in the patrol performed by the VIP system 100.

In operation, the VIP data collector 200 will not monitor and collect virus alerts unless the Include flag 1020 specifies inclusion. For example, in the illustrated embodiment, unless the Include flag 1020 has the value "1," (i.e. is "on"), the VIP data collector 200 bypasses the virus information repository 106A, 106B, or 106C that would have otherwise have been monitored by the VIP configuration data 120. In addition, when a last modified date 1008 indicating the last time the virus information repository 106A, 106B, or 106C was modified is the same as the current last modified date present on the virus information repository 106A, 106B, or 106C, the VIP data collector 200 will not monitor or collect virus alerts, since presumably nothing has changed since the last patrol. However, when a virus information repository 106A, 106B, or 106C is discovered during patrol that is specified for inclusion and was modified since the last patrol, the VIP data collector further examines the virus information repository 106A, 106B, or 106C to determine whether there exists a keyword-identified hyperlink address as specified in the keyword 1012 and/or alternate keyword 1014. If not, the VIP data collector 200 continues monitoring other virus information repositories in accordance with the VIP configuration data 120. However, when there is a keyword-identified hyperlink address as specified in the keyword 1012 and/or alternate keyword 1014, the VIP data collector 200 examines the URL Search and Replace terms 1014 and 1016 to determine whether the keyword-identified hyperlink address needs to be modified to point to the actual location of the virus alert information.

In one embodiment, when the URL Search and Replace terms 1014 and 1016 are not specified, as is the case with the record 1002 for company NAV, the VIP data collector 200 uses the VIP keyword-identified hyperlink address "as is." However, when the URL Search and Replace terms 1014 and 1016 are both specified, as is the case with the record 1002 for company NAI, the VIP data collector 200 replaces portion of the keyword-identified hyperlink address that matches the URL Search term 1014 with the URL Replace term 1016. On the other hand, when the URL Search term is not specified, but the URL Replace term 1016 is specified, as is the case with the record 1002 for company Trend, the VIP Data collector 200 simply appends the URL Replace term 1016 to the keyword-identified hyperlink address. Either way, the VIP data collector 200 can use the "as is" or modified keyword-identified hyperlink address to collect the virus alert information posted therein.

Using the illustrated example in FIG. 10, in the case of the record 1002 for the Trend company, the keyword-identified hyperlink address would be:

http://www. antivirus. com/pc-cillinlvinfo/venc/data and the modified keyword-identified hyperlink address resulting from the appended Replace term 1016 would be:

http://www.antivirus.com/pc-cillin/vinfo/venc/data&Vsect=T

In one embodiment, the VIP data collector 200 uses the virus alert information collected from the contents of the modified keyword-identified hyperlink to update the virus descriptor data 130, and further assigns a category to the collected data using the category specified in the Type indicator 1018 of the record 1002 that was used to control the monitoring and collecting of the data. For example, in one embodiment the VIP data collector could assign a "1" for a virus description, or a "2"for a virus news announcement in accordance with the VIP configuration data 120 Type indicator 1018. Other categories may be employed without departing from the scope of the present invention.

Figure 11:
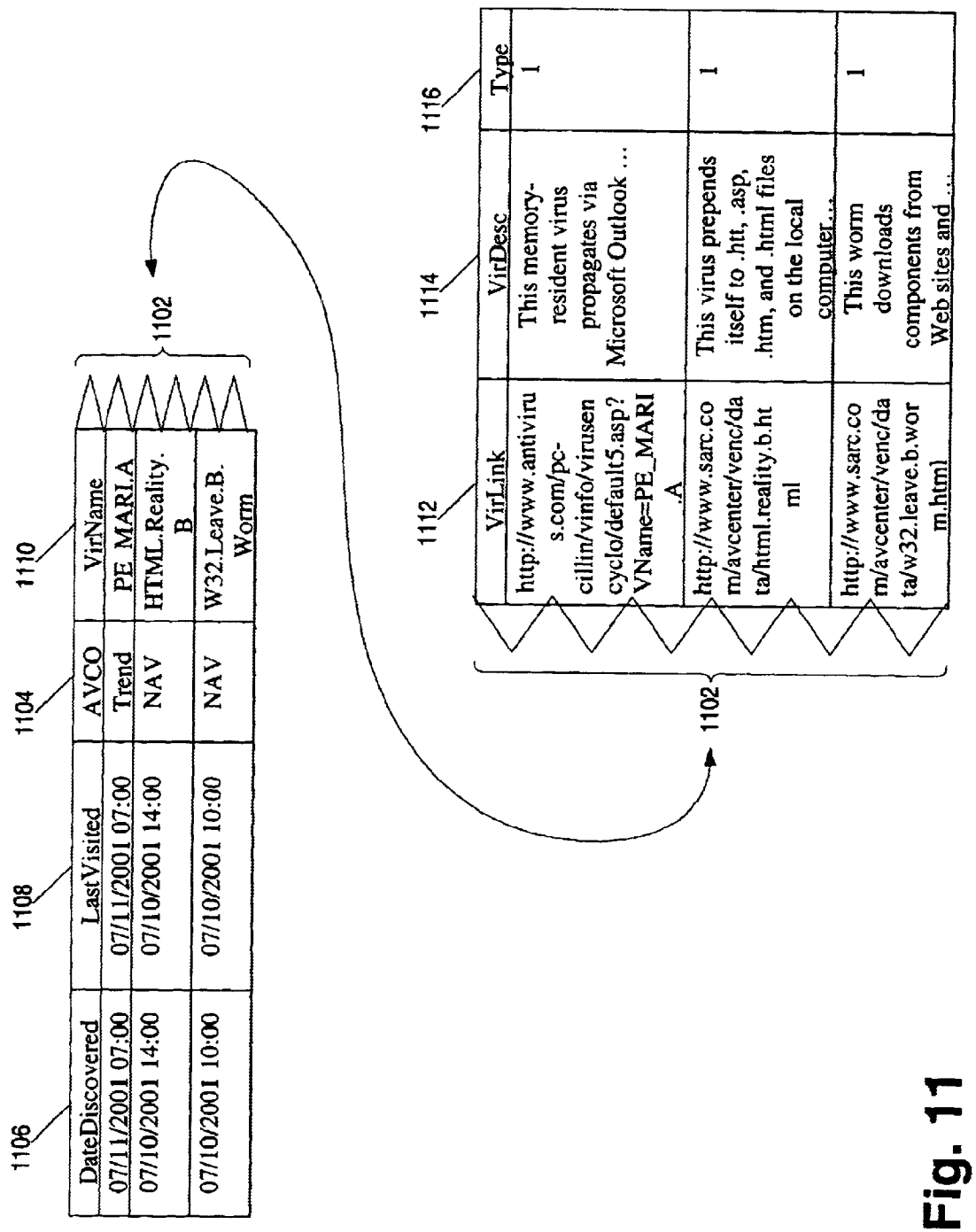
FIG. 11 illustrates various other aspects of a VIP database to be accessed by a computer executing one embodiment of the illustrated invention shown in FIG. 1.

FIG. 11 illustrates various other aspects of a VIP database 110 to be accessed by a computer executing one embodiment of the illustrated invention shown in FIG. 1. Specifically, FIG. 11 illustrate an example of the virus descriptor data 130 that is stored on VIP database 110. The virus descriptor data 130 comprises numerous records 1102 representing information about virus alerts that was collected from various virus information web servers 102A, 102B, and 102C, during patrol of those websites by the VIP system 100.

For example, FIG. 11 illustrates three records 1102 that are stored in the virus descriptor data 130. One of the records 1102 contains virus descriptor data for a virus alert for a virus named PE_MARI.A that was discovered on a virus information web server 102 for the company Trend on Jul. 11, 2001 at 7:00 am. As can be seen in FIG. 11, each record 1102 is comprised of numerous data fields that represent the virus descriptor data 130 that was collected about an identified virus alert during patrol by the VIP system 100. The data fields include a company name 1104 which identifies the anti-virus company with which the record 1102 is associated, a discovery date 1106 which contains the date-stamp of when the information about the virus alert was discovered and collected to the virus descriptor data 130, a last-visited date 1108 which contains the last date that the virus information web servers 102A, 102B, and 102C from which the descriptor data was collected was visited, a virus name 1110, which contains the name of the virus alert for which the record 1102 was created, a virus link 1112, which contains the URL of the keyword-identified hyperlink from which the descriptor data was collected, a virus description 1114, which contains the contents of the hyperlink specified in the virus link 112, and the type field 1116, which contains an indicator of the category to which the virus alert belongs, e.g. a virus description or a virus news announcement.

For example, in the illustrated embodiment, the record 1102 for the company Trend indicates that a virus named PE_MAR.A was discovered on Jul. 11, 2001 at 7:00 am, the last time the web site containing the virus alert was visited. The record 1102 for the company Trend comprises a virus link 1112 of http://www.antivirus.com/pc-cillin/vinfo/virusencyclo/ default5.asp?Vname=PE_MARI.A. The record 1102 for the company Trend further comprises a virus description 1114 of "This memory-resident virus propagates via Microsoft Outlook . . . " In one embodiment, the record 1102 for the company Trend further comprises a type 116 of the value "1" indicating that the virus descriptor data 130 for the virus alert represented by this record 1102 is of the virus description category as opposed to a virus news announcement category which could be indicated by a type 1116 of the value "2". Of course, as noted previously, other categories resulting in other values for type 1116 may be employed without departing from the scope of the invention.

Having described and illustrated the principles of the invention with reference to illustrated embodiments, it will be recognized that the illustrated embodiments can be modified in arrangement and detail without departing from such principles. For example, while the foregoing description focused on monitoring, collecting, and presenting virus information in the context of a system implemented on distributed interconnected network, it will be recognized that the above techniques and analyses can be applied to monitoring collecting, and presenting virus information data or even other types of data in other contexts such as an intranet or other closed system, and having comparable limitations.

And, even though the foregoing discussion has focused on particular embodiments, it is understood that other configurations are contemplated. In particular, even though expressions such as "in one embodiment" and the like may be used herein, such phrases are meant to generally reference embodiment possibilities, and are not intended to limit the invention to particular embodiment configurations. As used herein, these phrases may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto:

What is claimed is:

1. A method for obtaining virus information comprising:
  receiving a configuration data that identifies a location of at least one virus information repository;
  monitoring the identified virus information repository to discover a presence of at least one virus descriptor link;
  selecting the discovered virus descriptor link in accordance with a selection criteria from the configuration data; and
  updating a virus descriptor repository with a virus descriptor data associated with the selected virus descriptor link.

2. The method of claim 1, further comprising:
sending a notification to a subscriber of the virus descriptor data associated with the selected virus descriptor link.

3. The method of claim 1, wherein the selection criteria comprise at least one keyword that must be present in the selected virus descriptor link.

4. The method of claim 1, wherein the selection criteria comprise a replace string, and obtaining virus information further comprises appending the replace string to the selected virus descriptor link to obtain the virus descriptor data.

5. The method of claim 4, wherein the selection criteria further comprise a search string, and obtaining virus information further comprises replacing a portion of the selected virus descriptor link that matches the search string with the replace string to obtain the virus descriptor data.

6. The method of claim 1, wherein the selection criteria further comprise an include flag, and wherein selecting the discovered virus descriptor link is not performed unless the include flag is on.

7. The method of claim 1, wherein the selection criteria further comprises a last modified date, and wherein monitoring the identified virus information repository is not performed unless the virus information repository was modified after the last modified date.

8. The method of claim 1, wherein the virus information repository is a web site.

9. The method of claim 8, wherein the virus descriptor link is a hyperlink on the web site.

10. The method of claim 1, wherein the virus information repository is a database.

11. The method of claim 10, wherein the virus descriptor link is a pointer in the database that points to a file.

12. An apparatus comprising:
a machine-accessible medium having stored thereon executable instructions to cause a computer to perform operations comprising:
receiving a configuration data that identifies a location of at least one virus information repository;
monitoring the identified virus information repository until discovering the presence of at least one virus descriptor link;
selecting the discovered virus descriptor link in accordance with a selection criteria from the configuration data; and
updating a virus descriptor repository with a virus descriptor data associated with the selected virus descriptor link.

13. The apparatus of claim 12, wherein the executable instructions further comprise sending a notification to a subscriber of the virus descriptor data associated with the selected virus descriptor link.

14. The apparatus of claim 12, wherein the selection criteria comprise at least one keyword that must be present in the selected virus descriptor link.

15. The apparatus of claim 12, wherein the selection criteria further comprise a replace string that is appended to the selected virus descriptor link in order to obtain the virus descriptor data.

16. The apparatus of claim 15, wherein the selection criteria further comprise a search string, and wherein the replace string replaces that portion of the selected virus descriptor link that matches the search string in order to obtain the virus descriptor data.

17. The apparatus of claim 12, wherein the selection criteria further comprise an include flag, and wherein the discovered virus descriptor link is not selected unless the include flag is on.

18. The apparatus of claim 12, wherein the selection criteria further comprise a last modified date, and wherein the virus information repository is not monitored unless the virus information repository was modified after the last modified date.

19. The apparatus of claim 12, wherein the virus information repository is a web site.

20. The apparatus of claim 19, wherein the virus descriptor link is a hyperlink on the web site.

21. The apparatus of claim 12, wherein the virus information repository is a database.

22. The apparatus of claim 21, wherein the virus descriptor link is a pointer in the database that points to a file.

23. An virus information patroller comprising:
a receiver to receive a configuration data that identifies a location of at least one virus information repository;
a monitor to monitor the identified virus information repository until discovering the presence of at least one virus descriptor link;
a selector to select the discovered virus descriptor link in accordance with a selection criteria from the configuration data; and
a collector to update a virus descriptor repository with a virus descriptor data associated with the selected virus descriptor link.

24. The patroller of claim 23, further comprising a notifier to send a notification to a subscriber of the virus descriptor data associated with the selected virus descriptor link.

25. The patroller of claim 23, wherein the selection criteria comprise at least one keyword that must be present in the selected virus descriptor link.

26. The patroller of claim 25, wherein the selection criteria further comprise a replace string that is appended to the selected virus descriptor link in order to obtain the virus descriptor data.

27. The patroller of claim 26, wherein the selection criteria further comprise a search string, and wherein the replace string replaces that portion of the selected virus descriptor link that matches the search string in order to obtain the virus descriptor data.

28. The patroller of claim 23, wherein the selection criteria further comprise an include flag, and wherein the discovered virus descriptor link is not selected unless the include flag is on.

29. The patroller of claim 23, wherein the selection criteria further comprise a last modified date, and wherein the virus information repository is not monitored unless the virus information repository was modified after the last modified date.

30. The patroller of claim 23, wherein the virus information repository is a web site.

31. The patroller of claim 23, wherein the virus descriptor link is a hyperlink on the web site.

32. The patroller of claim 23, wherein the virus information repository is a database.

33. The patroller of claim 32, wherein the virus descriptor link is a pointer in the database that points to a file.

34. A computer system comprising:
a processor coupled to a system bus;
a memory coupled to the processor through the system bus;
a machine-accessible medium coupled to the processor through the system bus;
a virus information patrol process executed from the machine-accessible medium by the processor, wherein the virus information patrol process causes the processor to receive a configuration data that identifies a location of at least one virus information repository, to monitor the identified virus information repository until discovering the presence of at least one virus descriptor link, to select the discovered virus descriptor link in accordance with a selection criteria from the configuration data; and to update a virus descriptor repository with a virus descriptor data associated with the selected virus descriptor link.

35. The computer system of claim 34, wherein the virus information patrol process further causes the processor to send a notification to a subscriber of the virus descriptor data associated with the selected virus descriptor link.

36. The computer system of claim 34, wherein the selection criteria comprise at least one keyword that must be present in the selected virus descriptor link.

37. The computer system of claim 34, wherein the selection criteria further comprise a search string, and wherein the replace string replaces that portion of the selected virus descriptor link that matches the search string in order to obtain the virus descriptor data.

38. The computer system of claim 34, wherein the selection criteria further comprises an include flag, and wherein the discovered virus descriptor link is not selected unless the include flag is on.

39. The computer system of claim 34, wherein the selection criteria further comprises a last modified date, and wherein the virus information repository is not monitored unless the virus information repository was modified after the last modified date.

40. The computer system of claim 34, wherein the virus information repository is a web site.

41. The computer system of claim 40, wherein the virus descriptor link is a hyperlink on the web site.

42. The computer system of claim 34, wherein the virus information repository is a database.

43. The computer system of claim 42, wherein the virus descriptor link is a pointer in the database that points to a file.

* * * * *